Dec. 20, 1955  C. SAVAGE  2,728,064
POSITION INDICATOR FOR ELEVATOR CARS
Filed March 14, 1951  2 Sheets-Sheet 1
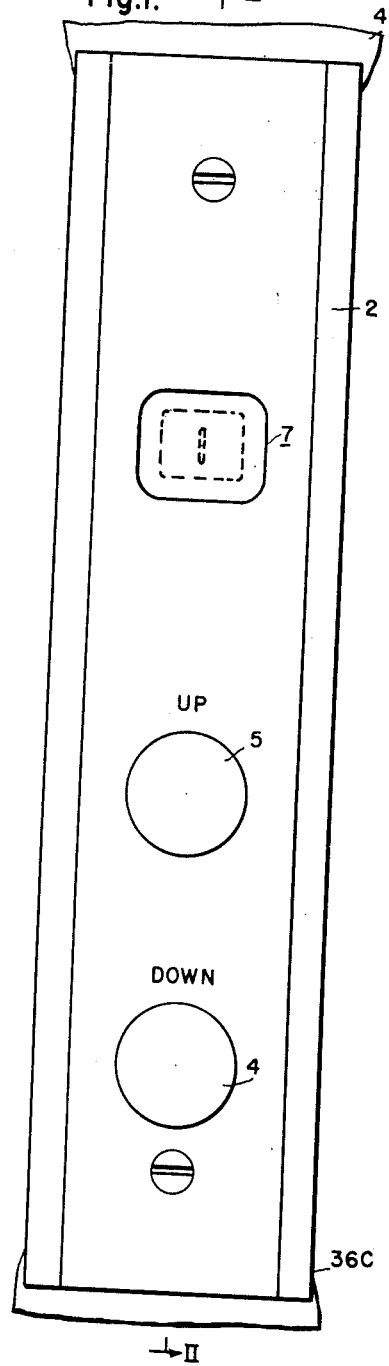
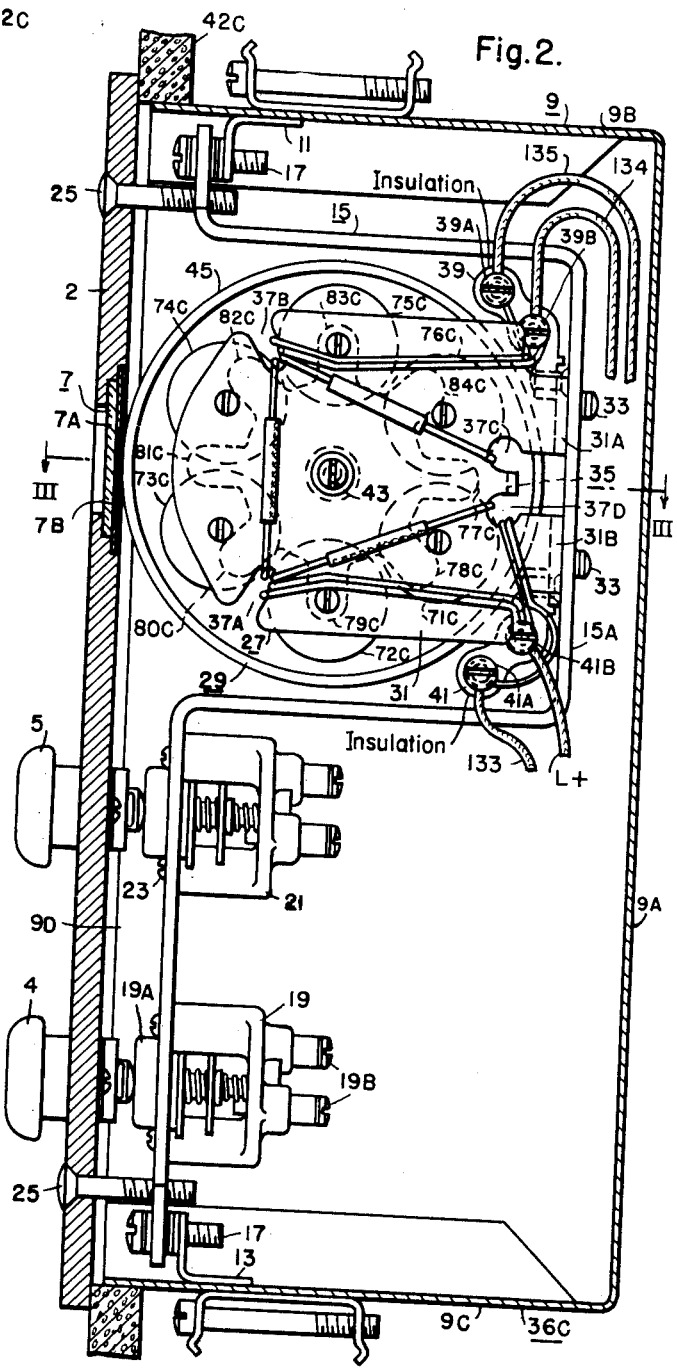
WITNESSES:
INVENTOR
Conwell Savage.
BY
ATTORNEY Dec. 20, 1955 C. SAVAGE 2,728,064
POSITION INDICATOR FOR ELEVATOR CARS
Filed March 14, 1951 2 Sheets-Sheet 2

INVENTOR
Conwell Savage.
BY *C. L. Freedman*
ATTORNEY

United States Patent Office 2,728,064
Patented Dec. 20, 1955

2,728,064

POSITION INDICATOR FOR ELEVATOR CARS

Conwell Savage, New York, N. Y., assignor to Westinghouse Electric Corporation, East Pittsburgh, Pa., a corporation of Pennsylvania Application March 14, 1951, Serial No. 215,461

12 Claims. (Cl. 340—21)

This invention relates to notching or stepping motors, and it has particular relation to notching or stepping motors as employed in position indicators or signal units for indicating the positions of elevator cars.

In accordance with the invention, a drum for indicating the position of an elevator car is moved in accordance with movements of the elevator car by means of a notching or stepping motor. The motor includes a stator having a fixed shaft, which is received within a hollow hub provided on the drum. A plurality of operating electromagnets are spaced uniformly around the shaft. The coils of the electromagnets are parallel to the shaft, and the electromagnets have pole faces disposed in a common plane which is transverse to the shaft. Movement of the drum is effected through a magnetic armature which is secured to the drum. The armature is disposed in a plane transverse to the shaft and is spaced axially along the shaft from the pole faces.

The electromagnets are arranged in pairs of opposite electromagnets and the pairs are energized successively to provide a force having two components acting between the armature and the stator. One of these force components produces a torque acting around the shaft to move the armature into a desired position relative to the stator. This torque has a zero value when the armature is in the desired position.

The remaining force component is a thrust force which acts parallel to the shaft. This thrust force has a maximum value when the armature occupies its desired position with respect to the stator. The thrust force is absorbed by a thrust bearing which has sufficient friction to prevent the armature from oscillating substantially about a desired position.

It is, therefore, an object of the invention to provide an improved notching or stepping motor which is substantially free from undesired oscillation.

It is a further object of the invention to provide a notching or stepping motor having a stator capable of exerting a torque on a rotor which acts about a predetermined axis and a thrust on the rotor which acts parallel to the axis.

It is also an object of the invention to provide a notching or stepping motor as set forth in the preceding paragraph wherein a thrust bearing is provided for absorbing the thrust with sufficient friction to prevent undesired oscillation of the rotor relative to the stator.

It is another object of the invention to provide a stepping or notching motor for operating a rotatable drum wherein the motor includes a stator having a stationary shaft and a plurality of electromagnets uniformly spaced about the shaft with their axes parallel to the shaft, and wherein the operating parts of the motor are substantially within the peripheral surface of the drum.

Other objects of the invention will be apparent from the following description taken in conjunction with the accompanying drawings in which:

Figure 1 is a view in front elevation of a push-button station or signal unit embodying the invention;

Figure 2 is a view in cross-sectional elevation of the push-button station or signal unit taken along the line II—II of Fig. 1;

Figure 3:
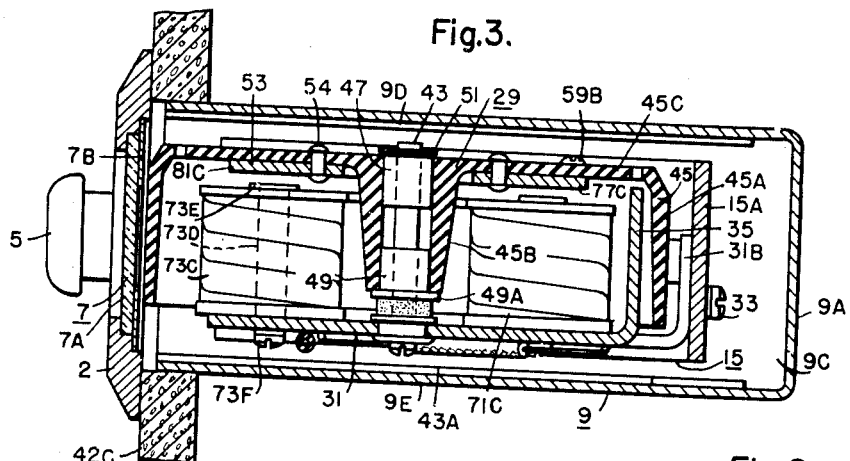
Figure 3 is an enlarged view in section taken along the line III—III of Figure 2.

The connection and operation of position indicators or signal units employing notching or stepping motors are well understood in the art. For example, reference may be made to the Nyburg Patent 1,990,665 and to the Baum Patent 2,303,423 for descriptions of such position indicators or signal units. In order to simplify the presentation of the invention, it will be assumed that the signal unit herein described is employed in place of the signal unit 36 of the aforesaid Baum patent.

Referring to the drawings, Figure 1 shows a signal unit or push-button station 36C, which may replace the signal unit 36 of the Baum patent. The signal unit 36C includes a face plate 2, which has an opening for reception of a down push button 4, an opening for reception of an up push button 5, and a window 7 for exposing indicia representing the position of an elevator car associated with the push-button station. From a study of the aforesaid Baum patent, it will be appreciated that a signal unit similar to that illustrated herein in Figure 1 will be employed at each of the intermediate floors served by the associated elevator car. A similar signal unit may be employed for the upper terminal floor, but if desired the up push button 5 may be omitted for such floor. Also, a similar signal unit may be employed for the lower terminal for, but, preferably, the down push button 4 is omitted for the lower terminal floor. It will be understood that the signal unit 36C is positioned in the corridor wall 42C, which corresponds to the corridor wall 42 of the Baum patent. Preferably, one of the signal units is positioned in the corridor wall for each floor adjacent the hoistway of the elevator associated therewith.

As shown in Figure 2, the signal unit 36C includes a rectangular box 9, which may be constructed in any suitable manner from sheet material such as sheet steel. This box is flush mounted in the corridor wall 42C and is secured to the wall in any suitable manner (not shown). The box has a rear wall 9A, an upper wall 9B, a lower wall 9C, a first side wall 9D, and a second side wall 9E (Figure 3). Two brackets 11 and 13 are secured, respectively, to the upper and lower walls 9B and 9C in any suitable manner, as by spot welding. To these brackets a support strap 15 is secured by machine screws 17.

The support strap 15 has secured thereto an up switch 21 and a down switch 19 by means of machine screws 23. These switches may be similar in construction. For example, the switch 19 has an operator 19A, which when actuated to the right (as viewed in Figure 2) against the bias of a spring establishes an electrical connection between two terminal screws 19B. Electrical connections from these switches extend to the machine room of the associated elevator through suitable knockouts (not shown) in the box 9. It will be understood that the switches 19 and 21 are positioned for operation by means of the push buttons 4 and 5. The face plate 2 is secured to the support strap 15 by means of machine screws 25, and covers the opening in the wall 42C which receives the box 9.

The support strap 15 has a portion 15A positioned adjacent the rear wall 9A for the purpose of supporting a position indicator. This position indicator includes a notching or stepping motor having a stator 27 and a rotor 29.

The stator 27 includes a base 31 of soft magnetic material, such as soft steel or sheet iron. The base has two angles 31A and 31B, which may be bent at right angles from the sheet material. These angles are positioned against the portion 15A of the strap and are secured thereto by machine screws 33. The base also has an angle or stop 35 bent therefrom. The purpose of this stop will be set forth below. Notches 37A, 37B, 37C and 37D are formed in the base to facilitate the location of electrical connections to the motor.

The base also has secured thereto in any suitable manner (as by means of rivets) two insulating blocks 39 and 41 (Fig. 2). These blocks carry terminal screws 39A, 39B, 41A and 41B, which are employed in conducting electrical energy to the motor. The conductors L+, 133, 134 and 135 of the aforesaid Baum patent are illustrated in Figure 2 as connected to the terminal screws.

Figure 6:
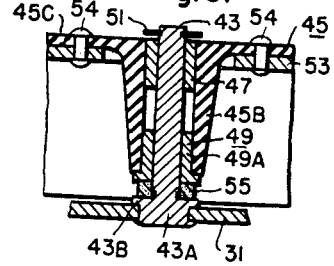
Figure 6 is a view in section showing a bearing assembly suitable for the push-button station or signal unit of Figures 1, 2 and 3.

A stationary shaft 43 (Figures 3 and 6) is suitably secured to the base 31. To this end, the shaft 43 may have an enlarged head 43A (Fig. 6), which extends through the base 31. A flange 43B on the head engages one face of the base 31, and the projecting portion of the head 43A is upset to rivet the shaft 43 securely to the base.

A plurality of electromagnets are secured to the base 31 and are distributed uniformly around the shaft. In the present embodiment, six electromagnets are employed and these have magnetizing windings or coils 71C to 76C, respectively. As shown more clearly in Figure 3, the electromagnets have cores, which are constructed of a soft magnetic material such as soft iron or soft steel. For example, the magnetizing winding 73C has an opening through which its core 73D extends. The core 73D has a pole piece 73E, which is in the form of a head extending partly over one end of the magnetizing winding. The core is secured to the base 31 by means of a machine screw 73F, which also may be constructed of soft magnetic material. The remaining magnetizing windings and cores are similar in construction. It will be noted that the pole pieces of the cores provide pole faces, which lie in a common plane transverse to the shaft 43.

The rotor 29 includes a drum or cup 45, which has a substantially cylindrical peripheral surface 45A, a hollow hub 45B concentric with the peripheral surface, and a radial wall 45C. The drum may be conveniently molded of any desired material. Preferably, the drum is molded as an integral unit from a non-magnetic material, such as a phenolic resin.

It will be noted that the shaft 43 projects through the opening in the hub 45B. To facilitate rotation of the drum on the shaft, a pair of bearing bushings 47 and 49 is provided for rotatably receiving the shaft 43. The bushings may be a press fit in the opening of the hollow hub 45B. The drum may be retained on the shaft in any desired manner. For example, the end of the shaft may have a groove for reception of a conventional horseshoe-shaped lock washer 51.

Figure 4:
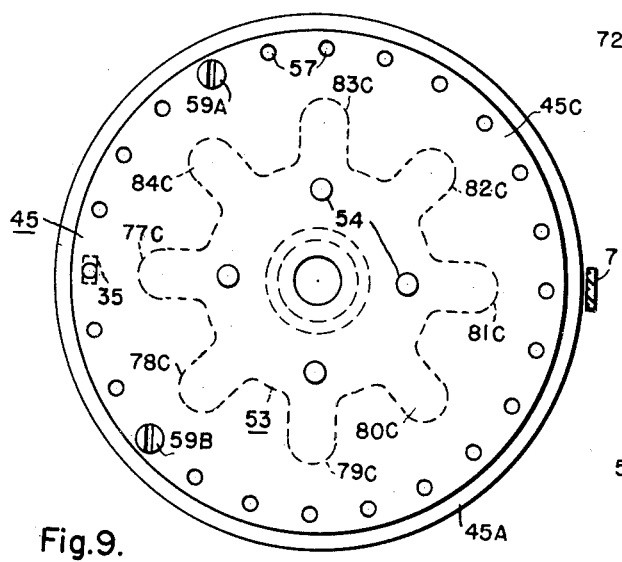
Figure 4 is a view in side elevation of a rotor assembly suitable for the push-button station or signal unit of Figures 1, 2 and 3.

A soft magnetic armature 53 is secured to the drum in any suitable manner, as by means of rivets 54. This armature has a plurality of pairs of polar projections positioned to move past the pole faces of the electromagnets as the armature rotates about the shaft 43. The number of polar projections is so selected that only two projections on opposite sides of the shaft can be aligned with the pole faces at one time. Inasmuch as three pairs of electromagnets are employed, the number of polar projections adopted should be an even number which is not divisible by three. Eight polar projections 77C to 84C (as illustrated in Figures 2 and 4) have been found suitable. These polar projections are uniformly spaced about the axis of the drum.

Because of the positioning of the armature and the electromagnets, a substantial thrust force is available which acts between the rotor and the stator in a direction parallel to the shaft 43. This thrust force is utilized in damping or preventing undesired oscillations of the rotor relative to the stator. To this end a thrust bearing is provided which offers a sufficient amount of friction to relative movement of the rotor and stator to prevent undesired movement of the rotor away from a desired position. Conveniently, the bushing 49 may have a flange 49A, which extends over the lower end of the hub 45B (as viewed in Figures 3 and 6) and serves as one member of the thrust bearing assembly. The second member of the assembly comprises a washer 55. The third member comprises the shaft flange 43B. The washer develops sufficient friction with the bushing flange and with the shaft flange to prevent undesired oscillations of the rotor relative to the stator. Various materials may be employed in such a thrust bearing assembly. For example, the bushing 49 may be of brass, bronze, or steel, and the washer 55 may be of leather or of conventional brake or clutch facing compositions. In a preferred embodiment of the invention, it has been found that a bushing 49 of silicon bronze and a washer 55 of carbon and a shaft 43 of stainless steel have been unusually satisfactory. The bushing 49 may be constructed of a silicon-bronze comprising essentially one-half to three percent by weight of silicon, the balance being of copper. If desired, slight amounts of zinc or manganese may be added to the silicon bronze.

The washer 55 desirably may be constructed of compressed carbon powder. The physical properties of the resulting washer may be such that the washer material has a crushing strength of 18,000 p. s. i., a shear strength of 4,300 p. s. i., a tensile strength of 1,000 p. s. i. and a Shore Durometer hardness of 77. Such material is available on the market.

The shaft 43 preferably is constructed of a stainless steel, such as one containing thirteen percent of chromium by weight. The radial bearing offers a slight resistance to the rotation of the rotor relative to the stator under the influence of vibration, and prevents the drum from creeping when the coils are not energized. As previously pointed out the friction introduced by the thrust bearing assembly when the coils are energized is sufficient to hold the rotor assembly in a desired position without undue oscillation or movement under the influence of vibration.

Preferably, the washer 55 is free to rotate on the shaft 43. If the washer is free to rotate and if the parts are constructed as illustrated of the preferred materials, the washer 55 rotates at rate substantially less than that of the bushing 49 relative to the shaft. For example, the washer may rotate at approximately one half the rate of rotation of the bushing.

Figure 5:
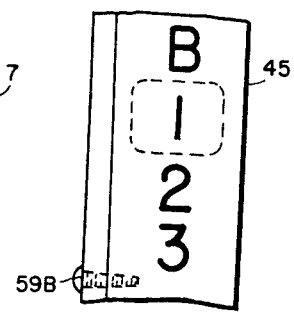
Figure 5 is a view in front elevation (with parts broken away) of the rotor illustrated in Figure 4.

The drum 45 has engraved or otherwise applied to its peripheral surface suitable indicia representative of the floors served by the associated elevator car. For example, as shown in Figure 5, the indicia B, 1, 2 and 3 are engraved on the surface of the drum to represent, respectively, the basement, first, second, and third floors served by the elevator car. As the elevator car moves, these indicia are successively exposed through the window 7. By inspection of Figures 2 and 3, it will be observed that the window has a transparent sheet of glass 7A thereacross, the glass being secured in position by a mask plate 7B having an opening, which defines the portion of the drum which is available for observation. The portion of the drum which is available for observation is represented in Figure 5 by a broken line.

With the proportions herein illustrated, the drum is rotated through an angle of 15° for each notch or step thereof. For this reason, the successive indicia on the face of the drum may be spaced from each other about the axis of rotation of the drum by an angle of 15°.

Although the drum rarely will be out of step with the elevator car, it is a simple matter to provide the drum with an automatic registering device. As shown in Figure 4, the drum is provided with a plurality of openings 57, which are spaced uniformly about the axis of the drum. These openings extend through the radial wall 45C in a direction parallel to the axis of rotation of the drum. Since the drum rotates 15° for each step, the openings are spaced from each other by 15°. This means that twenty-four openings are distributed uniformly around the axis of the drum.

In order to limit the movement of the drum to a predetermined arc, self-tapping screws 59A and 59B may be inserted through certain of the openings 57. The screw 59A cooperates with the stop 35 to define the upper terminal limit of movement of the drum. For example, let it be assumed that the elevator car serves a total of six floors including a basement, a sub-basement, and four additional floors. When the elevator car is positioned at the upper terminal floor, the terminal screw 59A should be adjacent the stop 35. If the drum is displaced from its proper position in a counterclockwise direction (as viewed in Figure 4), the screw 59A engages the stop 35 during movement of the elevator car upwardly to prevent further rotation of the drum. (The drum steps in a counterclockwise direction, as viewed in Figure 4, during upward travel of the elevator car.)

In a similar manner, when the elevator car is at the sub-basement, the screw 59B should be adjacent the stop 35. If the drum 45 is displaced clockwise from the position which it should occupy, the screw 59B will engage the stop 35 during downward movement of the elevator car to reset the drum as the elevator car approaches the sub-basement floor. The specific holes into which the screws 59A and 59B are inserted depend upon the number and arrangement of the floors. In each case they are inserted to define the limits of movement of the drum 45.

It will be appreciated that the size of the signal unit may be varied in accordance with requirements. The various parts shown in Figures 3, 4, 5 and 6 may be constructed in the illustrated proportions. As illustrative of the scale, the drum 45 may have a diameter of four inches.

Figure 7:
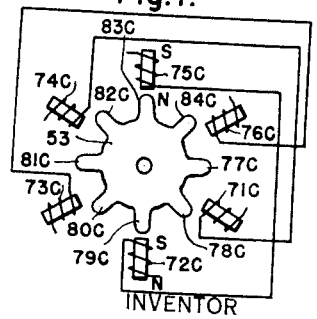
Figure 7 is a schematic view showing the prior art relationship of electromagnets and armature of a notching or stepping motor.

In considering the operation of the signal unit, it will be helpful to refer first to the schematic showing of Figure 7. In Figure 7 the armature 53 is illustrated in association with the electromagnets. However, the electromagnets have been rotated 90° from their normal positions and are illustrated as surrounding the armature 53. The polar projections 77C to 84C correspond to the armature faces 77 to 84, respectively, of the aforesaid Baum patent. The windings 71C to 76C correspond respectively to the windings 71w to 76w of the aforesaid Baum patent and are similarly connected and energized.

It will be assumed first that the windings 72C and 75C are energized in series. Although these windings could be energized from an alternating-current source, preferably they are energized from a direct-current source to provide polarities as indicated by the marks S for south pole and N for north pole. If energized by alternating current, the polarities would be instantaneous polarities. Since 125-volt direct-current sources generally are available in elevator installations, the windings conveniently may be designed for a normal energizing voltage of 61½ volts each.

Since the polar projections 79C and 83C are aligned with the windings 72C and 75C, the resultant force acting between the rotor and stator to produce rotation has a value of zero. As the polar projections 79C and 83C are displaced in either a clockwise or counterclockwise direction from the positions illustrated in Figure 7, the resultant force produces a torque acting to return the rotor into the position illustrated in Figure 7.

Let it be assumed next that the windings 72C and 75C are deenergized and that the windings 73C and 76C are energized. Since the last-named two windings are closest to the polar projections 84C and 80C, the resultant force acting between the rotor and stator acts to move the rotor 15° into a position wherein the polar projections 80C and 84C are in alignment with the windings 73C and 76C. Should the windings 73C and 76C thereafter be deenergized and the windings 71C and 74C be energized, the rotor again would be stepped 15° to bring the polar projections 77C and 81C into alignment with the windings 71C and 74C. In this way, the successive energizations of pairs of windings step the rotor successively in a clockwise direction (as viewed in Figure 7) by steps of 15°.

Rotation of the rotor in a reverse direction also may be obtained readily; for example, if the rotor occupies the position illustrated in Figure 7, energization of the windings 71C and 74C rotates the rotor 15° in a counterclockwise direction to bring the polar projections 78C and 82C into alignment with the windings 71C and 74C. Upon deenergization of these windings and energization of the windings 73C and 76C, the rotor again is stepped 15° in a counterclockwise direction to bring the polar projections 77C and 81C into alignment with the windings 76C and 73C. The operation of the construction illustrated in Figure 7 is essentially similar to that of the structure shown in the aforesaid Baum patent.

Figure 8:
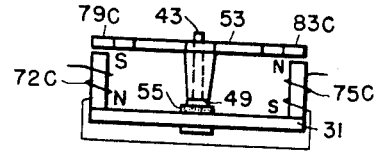
Figure 8 is a schematic view of the armature and certain of the electromagnets employed in the signal unit of Figures 1, 2 and 3.

In order to eliminate oscillations resulting from the inertia of the parts or from vibration, a spring brake may be applied to the rotor of Figure 7 in the manner set forth in the aforesaid Baum patent. Although such a brake may be employed in the embodiment of Figures 1 to 6, it has been found that the thrust bearing alone suffices to eliminate or minimize adequately such oscillation. The operation of the thrust bearing will be considered now with reference to Figure 8. In Figure 8 the armature 53 and the base 31 are shown associated with the electromagnets having windings 72C and 75C. In order to simplify the figure, the remaining electromagnets have been omitted.

Let it be assumed that the windings 72C and 75C are again energized in series to provide polarities as indicated in Figure 8. It will be noted that a substantially continuous magnetic path is provided for flux generated by the windings. This path is formed by the loop comprising the armature 53, the base 31, and the two electromagnets. The only air gaps are the two short air gaps existing between the armature 53 and the two pole faces of the electromagnets. It will be noted that in this flux path the two magnetomotive forces of the electromagnets are in the same direction.

If the polar projections 79C and 83C are aligned with the windings 72C and 75C, the resultant force acting between the rotor and stator of Figure 8 is parallel to the shaft 43. This force develops a thrust which is absorbed by the thrust bearing comprising the bushing 49, the washer 55 and the shaft 43. As the polar projections are rotated away from their positions in alignment with the electromagnets, the force component parallel to the shaft 43 decreases. Consequently, the thrust is a maximum when the polar projections occupy a desired position in alignment with the windings 72C and 75C.

Because of the variation in the thrust, the thrust bearing develops its maximum braking effort when the rotor occupies a desired position with respect to the stator. When the rotor is displaced from this desired position, the thrust bearing offers a relatively small braking effort to rotation of the rotor relative to the stator.

As the rotor 53 is displaced from the position illustrated in Figure 8 about the shaft 43, a second force component is introduced which acts between the rotor and stator. This second force component produces a torque acting about the shaft 43 to return the rotor into the desired position with respect to the stator. The force component which produces the torque also varies with the position of the rotor in a direction opposite to the variation of the thrust force. Because of these variations in the thrust force and torque, an unusually effective braking effort is obtained which substantially prevents undesired oscillation of the rotor with respect to the stator.

Figure 9:
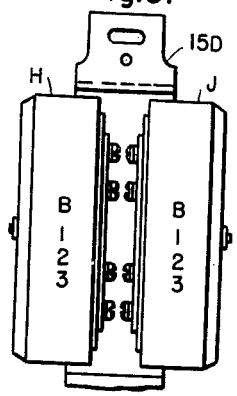
Figure 9 is a view in front elevation of a dual position indicator employing two notching or stepping motors.

In some elevator systems, two elevator cars are arranged in adjacent hoistways. A dual signal unit may be located at each floor served by the bank of elevator cars. Such a signal unit is illustrated in Figure 9. In this figure, a strap 15D, which corresponds to the strap 15 of Figures 1 and 3, has secured thereto a notching or stepping motor H, which is similar to that illustrated in Figures 1 to 6. However, the motor in Figure 9 is displaced to the left relative to the strap 15D to permit the mounting of a second notching motor J on the same strap. The notching motor J is similar to the notching motor H except that it is reversed relative to the motor H about a line transverse to the axis of rotation of the rotors of the motors. Each of the motors of Figure 9 would be associated with a separate one of the two elevators in substantially the same manner. Preferably, the connections are so arranged that the two drums are actuated in the same direction about their common axis of rotation when the two elevator cars move in the same direction. A box and a face plate may be provided for the motors of Figure 9, which are similar to those illustrated in Figures 1 and 3, except for an increase in width. It will be understood that the face plate employed for the unit illustrated in Figure 9 would have a separate window for each of the drums. The construction of Figure 9 permits the stator assemblies to be located substantially over the strap 15D and permits connections to the motors to be located between the two motors.

Although the invention has been described with reference to certain specific embodiments thereof, numerous modifications falling within the spirit and scope of the invention are possible.

I claim as my invention:

1. In a notching motor, a stator including an even number of pole pieces disposed uniformly about an axis, said pole pieces having pole faces disposed in a common plane transverse to said axis, a rotor of paramagnetic material disposed for rotation relative to the stator about said axis, said rotor having an even number of polar projections disposed uniformly about said axis for movement adjacent said pole faces and located in a plane parallel and adjacent to said first-named plane, the number of said polar projections being selected to permit only two polar projections on opposite sides of the axis to be adjacent said pole faces at any time, said pole pieces being divided into separate pairs, each of said pairs comprising two of said pole faces on opposite sides of said axis, separate means for energizing each of said pairs to direct magnetic flux through the two associated pole faces and through the rotor, whereby energization of one of said pairs results in application of a torque acting about said axis and a force acting parallel to said axis between said rotor and said stator, a bearing assembly permitting rotation of the rotor relative to the pole pieces, and a thrust bearing for resisting movement of said rotor relative to the pole pieces by said force, said thrust bearing comprising a damping material for restricting movements of the rotor relative to the stator under the influence of inertia.

2. A motor as defined in claim 1 wherein the ends of the pole pieces opposite to said pole faces are secured to a paramagnetic member.

3. A motor as defined in claim 1 in combination with a drum coupled to said rotor for movement about said axis, said drum substantially surrounding said pole pieces.

4. A motor as defined in claim 3 wherein said drum has a hollow hub concentric with the peripheral surface of the drum, said bearing assembly comprising a bearing shaft secured to the stator and projecting within said hub.

5. In an indicator device, a rotor, a stator, bearing means mounting the rotor for rotation relative to said stator about an axis, electroresponsive means for applying a force between the rotor and the stator for moving the rotor through a fraction of a revolution, said force increasing as said rotor moves through said fraction and including a substantial component acting to produce a torque about the axis and a substantial component increasing as said rotor moves through said fraction and acting parallel to said axis to produce thrust, and a thrust bearing for receiving said thrust, said thrust bearing offering substantially greater friction than said bearing means to movement of the rotor away from a desired position relative to the stator.

6. A device as claimed in claim 5 wherein the thrust bearing comprises a first member secured to the rotor, a second member secured to the stator and a third member positioned between and engaging said first and second members, said third member being rotatable relative to the rotor and the stator about said axis.

7. A device as claimed in claim 5 wherein the thrust bearing comprises a member substantially constructed of carbon and coacting members constructed substantially of silicon bronze and of stainless steel for engaging the carbon member.

8. In a notching motor, a stator including an even number of pole pieces disposed uniformly about an axis, said pole pieces having pole faces disposed in a common plane transverse to said axis, a rotor of paramagnetic material disposed for rotation relative to the stator about said axis, said rotor having an even number of polar projections disposed uniformly about said axis for movement adjacent said pole faces and located in a plane parallel adjacent to said first-named plane, the number of said polar projections being selected to permit only two polar projections on opposite sides of the axis to be adjacent said pole faces at any time, said pole pieces being divided into separate pairs, each of said pairs comprising two of said pole faces on opposite sides of said axis, separate means for energizing each of said pairs to direct magnetic flux through the two associated pole faces and through the rotor, whereby energization of one of said pairs results in application of a torque acting about said axis and a force acting parallel to said axis between said rotor and said stator, a bearing assembly permitting rotation of the rotor relative to the pole pieces, and a thrust bearing for resisting movement of said rotor relative to the pole pieces by said force, said thrust bearing comprising a thrust receiving member interposed between the stator and the rotor for damping and restricting movements of the rotor relative to the stator under the influence of inertia, said thrust receiving member being constructed of a carbon friction material.

9. In a notching motor, a stator including an even number of pole pieces disposed uniformly about an axis, said pole pieces having pole faces disposed in a common plane transverse to said axis, a rotor of paramagnetic material disposed for rotation relative to the stator about said axis, said rotor having an even number of polar projections disposed uniformly about said axis for movement adjacent said pole faces and located in a plane parallel and adjacent to said first-named plane, the number of said polar projections being selected to permit only two polar projections on opposite sides of the axis to be adjacent said pole faces at any time, said pole pieces being divided into separate pairs, each of said pairs comprising two of said pole faces on opposite sides of said axis, separate means for energizing each of said pairs to direct magnetic flux through the two associated pole faces and through the rotor, whereby energization of one of said pairs results in application of a torque acting about said axis and a force acting parallel to said axis between said rotor and said stator, a bearing assembly permitting rotation of the rotor relative to the pole pieces, and a thrust bearing for resisting movement of said rotor relative to the pole pieces by said force, said thrust bearing comprising a damping material for restricting movements of the rotor relative to the stator under the influence of inertia, said bearing assembly comprising a low-friction bearing unit offering substantially less frictional resistance than said thrust bearing to rotation of the rotor relative to the stator.

10. In an indicator device, a pair of cup-shaped drums each having indicia angularly spaced about the axis thereof, means mounting the drums for independent rotation adjacent each other about a common axis, said drums being inverted relative to each other about an axis transverse to the first-named axis, and separate notching motor means for notching each of the drums about its axis, each of the notching motor means being positioned substantially within its associated drum, and the motor means having electrical connections located substantially in the space between the drums.

11. In an indicator device, a pair of cup-shaped drums each having indicia angularly spaced about the axis thereof, means mounting the drums for independent rotation adjacent each other about a common axis, said drums being inverted relative to each other about an axis to place the open ends of the drums adjacent each other, and separate notching motor means for notching each of the drums about its axis, each of the notching motor means being positioned substantially within its associated drum, each of the notching motor means comprising a paramagnetic notching rotor secured within the associated drum adjacent the end well of such associated drum, and notching pole piece means located substantially within the associated drum for notching the associated motor in response to energization of the pole piece means, and the motor means having electrical connections located substantially in the space between the drums.

12. In an indicator device, a rotor unit including a drum having indicia spaced angularly about the drum axis and having an integral hollow hub concentric with the surface of the drum, said hub being substantially within the drum, a stator unit, bearing means including a shaft secured to the stator unit, said shaft extending into the hollow hub, said bearing means mounting the rotor for rotation about said shaft, said stator providing an indicia station adjacent the rim of the drum, notching motor means located substantially within said drum for notching the drum about the shaft to selected positions relative to the stator unit for successively positioning said indicia at said station, and adjustable stop mechanism positioned substantially within the drum for defining limits of rotation of the rotor unit relative to the stator unit, said stop mechanism comprising first and second stop elements positioned on a first one of said units and independently adjustable about said axis, and stop means secured to a second one of said units intermediate said stop elements, said stop means engaging the first stop element to limit rotation of the rotor unit relative to the stator unit in a first direction, and said stop means engaging the second stop element to limit rotation of the rotor unit in a second direction.

References Cited in the file of this patent

UNITED STATES PATENTS

| | | |
|---|---|---|
| 155,396 | Van Hoevenbergh | Sept. 29, 1874 |
| 515,216 | Gutmann | Feb. 20, 1894 |
| 540,456 | Pearce | June 4, 1895 |
| 1,058,545 | Caldwell | Apr. 8, 1913 |
| 1,229,785 | Proebstel | June 12, 1917 |
| 1,501,497 | Schwarz | July 15, 1924 |
| 1,502,840 | Beard | July 29, 1924 |
| 1,504,609 | Crane | Aug. 12, 1924 |
| 1,778,761 | Heising | Oct. 21, 1930 |
| 1,890,752 | Sanford | Dec. 13, 1932 |
| 1,903,230 | Stewart | Mar. 28, 1933 |
| 1,915,090 | Hammond | June 20, 1933 |
| 2,298,621 | Holland-Letz | Oct. 13, 1942 |
| 2,303,423 | Baum | Dec. 1, 1942 |
| 2,559,339 | Blease et al. | July 3, 1951 |

FOREIGN PATENTS

| | | |
|---|---|---|
| 6,346 | Australia | of 1932 |